United States Patent [19]
Schott, Jr.

[11] 3,883,389
[45] May 13, 1975

[54] CONTINUOUS RECIPROCATING WEB DRIVE MEANS WORKING WITH INTERMITTENT HEAT SEAL FORMING MEANS

[75] Inventor: Charles M. Schott, Jr., Gloucester, Mass.

[73] Assignee: Gloucester Engineering Co. Inc., Gloucester, Mass.

[22] Filed: Nov. 15, 1973

[21] Appl. No.: 415,956

Related U.S. Application Data

[62] Division of Ser. No. 159,993, July 6, 1971, Pat. No. 3,775,225.

[52] U.S. Cl. .................. 156/583; 83/235; 226/113
[51] Int. Cl. ............................................. B30b 15/34
[58] Field of Search ........................ 156/251-253, 156/306, 311, 350, 359, 361, 363, 378, 494, 495, 503, 515, 518, 528, 530, 570, 583; 83/235, 627; 226/113

[56] References Cited
UNITED STATES PATENTS

| | | | |
|---|---|---|---|
| 2,667,924 | 2/1954 | Dutro | 83/235 |
| 3,058,869 | 10/1962 | Cohen et al. | 156/350 |
| 3,060,075 | 10/1962 | Kincaid | 156/251 |
| 3,084,841 | 4/1963 | Hata et al. | 226/113 |
| 3,322,604 | 5/1967 | Schott | 156/583 |
| 3,361,614 | 1/1968 | Schott | 156/583 |
| 3,454,447 | 7/1969 | Corbett et al. | 156/361 |
| 3,526,563 | 9/1970 | Schott | 156/583 |
| 3,622,421 | 11/1971 | Cook | 156/311 |

Primary Examiner—Charles E. Van Horn
Assistant Examiner—John E. Kittle

[57] ABSTRACT

Machines with elongated elements operable on an advancing web such as heat seal bar, perforator blade and clamp for plastic film. Slackness in web during heat sealing or supplemental indexing is produced by rotation of the normally stationary portion of a single direction clutch whose movable part is engaged with a shuttle belt. Compensation for slip and slackening also are achievable employing a differential drive between input and output nip roll pairs, with selected driving of the third shaft of the differential. Prolonged driving of the same differential can establish a desired speed ratio between the two nip pairs to compensate for slip, and change of the rotational input in response to a position sensor serves as a registry control.

1 Claim, 3 Drawing Figures

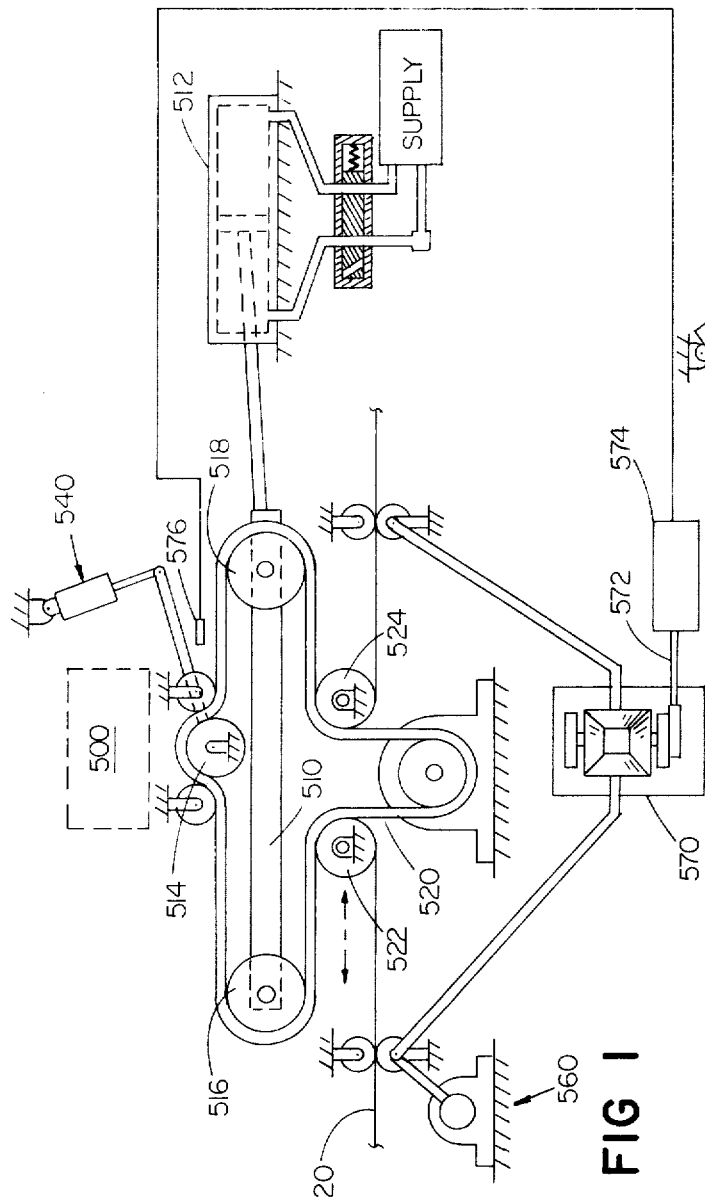
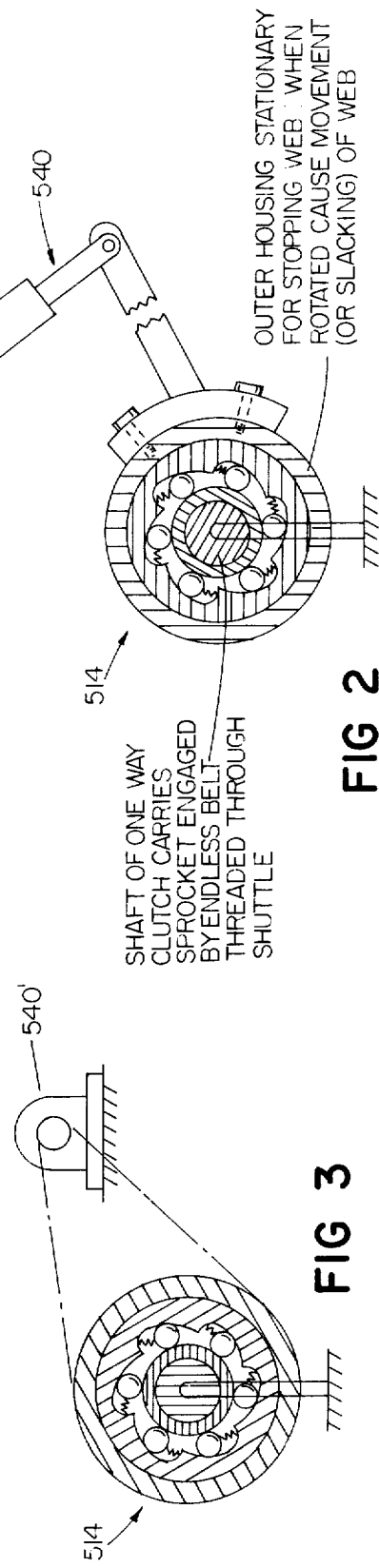
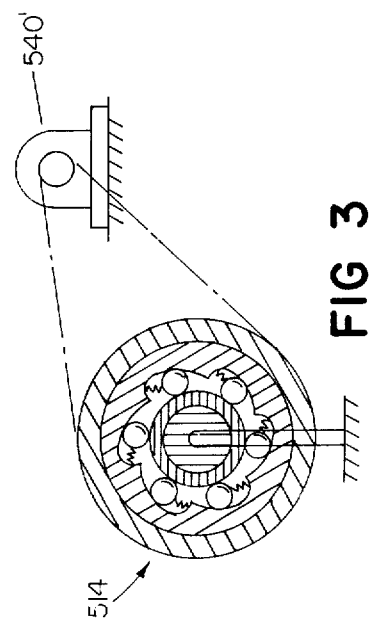
FIG 1
FIG 2 — SHAFT OF ONE WAY CLUTCH CARRIES SPROCKET ENGAGED BY ENDLESS BELT THREADED THROUGH SHUTTLE. OUTER HOUSING STATIONARY FOR STOPPING WEB; WHEN ROTATED CAUSE MOVEMENT (OR SLACKING) OF WEB
FIG 3

CONTINUOUS RECIPROCATING WEB DRIVE MEANS WORKING WITH INTERMITTENT HEAT SEAL FORMING MEANS

This application is a division of copending application Ser. No. 159,993, filed July 6, 1971, now U.S. Pat. No. 3,775,225.

This invention relates to machines of the type having an elongated element which periodically acts upon a web. It is particularly relevant to the making of long formations or imprints in plastic film and sheet and to machines for making plastic bags.

Objects of the invention include providing such machines which are reliable and of high speed and in which the reciprocating member can be made of any length, e.g. longer than 10 feet, to span webs of similar width.

Particular objects are to provide such a machine which can act upon wide plastic webs with controllable accuracy over the entire extent of the active element.

In connection with the foregoing, further objects are to provide means for web adjustment, slackening and supplemental indexing.

The invention features drive control means in a heat sealing machine operable on continuous plastic web. The machine includes a pair of shuttle rolls movable in unison above a pair of more closely spaced idler rolls, adapted to have the web threaded thereabout. A drive means is arranged to drive the shuttle rolls to temporarily stop the web and a heat seal die is provided for forming a heat seal in the web when it is stopped.

In one aspect the drive means includes an endless belt threaded about the pairs of rolls and a one-way clutch engaged therewith to prevent movement of the belt during formation. In this aspect the invention features a drive means combined with the clutch for selectively driving the normally stationary part of the clutch after a formation is made to cause web movement despite continued normal web-stopping movement of the shuttle.

In another aspect, the invention features a differential drive system interposed between nip rolls associated with the input and output of the machine and a drive means operable to provide an auxiliary driven input to the differential drive system to alter the relative speed of the two nip roll pairs. In preferred embodiments an automatic position detector is arranged to control the auxiliary input to the differential drive and means are provided to apply an incremental further differential input to temporarily alter the speed ratio of said pairs of nips to relax the tension of the web therebetween.

These and other objects and features of the invention will be more fully understood in the light of the following description of the preferred embodiments in connection with the drawings, wherein:

FIG. 1 is a diagrammatic side view of a machine embodying a web drive according to the invention; and FIGS. 2 and 3 are cross-sectional, partially diagrammatic views of preferred one way clutch assemblies for accomplishing web slackening and supplemental indexing.

Referring to FIG. 1 of the drawings, a continuous plastic web 20 is driven (and stopped) periodically through a web processing machine by a shuttle arrangement such as is shown in applicant's prior patents, Nos. 3,322,604, 3,361,614 and 3,526,563, to which reference is made. As shown in FIG. 1, the shuttle arrangement includes a shuttle 510 reciprocally driven by cylinder 512. A pair of shuttle rolls 516, 518 are mounted for movement in unison with the shuttle above a pair of more closely spaced idler rolls 522, 524. Plastic web 10 is threaded about the idler and shuttle rolls 522, 516, 518, 524.

The machine shown in FIG. 1 includes improvements enabling relaxation or supplementary indexing of the web.

The forming head 500 corresponds to the heat seal and perforator machine, including a heat seal die for forming a heat seal in the stopped web, discussed in U.S. application Ser. No. 159,993 of which this is a division. The shuttle 510 driven by cylinder 512 takes up and pays out the web and the single direction clutch 514, with its outer race normally stationary and its inner race engaged with endless timing belt 520, threaded about rolls 522, 516, 518, 524, all as explained in U.S. Pat. No. 3,526,563.

According to the present invention instead of permanently mounting the outer race of the single direction clutch, it is mounted to rotate, and a periodically operating drive, here cylinder 540 is adapted to be actuated immediately after the heat seal bar raises, as shown in FIG. 2. The result of this movement is that the plastic film moves slightly after heat sealing, proportional to the rotation of the outer race, despite continued normal web-stopping movement of the shuttle and is thus removed from the hot jaws of the heat seal bar where it is cooled. Upon reversal of the movement of the shuttle the cylinder may be returned to its original position, thus assuring registry.

In FIG. 3 an alternate device is shown consisting of a chain drive which can selectively drive the outer race. A longer range of travel can be obtained, thus to achieve a supplementary indexing effect. For instance the plastic heat seal can be advanced to a pair of cooling jaws.

Referring again to FIG. 1 there is also provided a drive 560 for one pair of nip rolls the second pair being driven through a differential 570. A third input shaft 572 to the differential selectively driven by the motor 574 provides a different speed. This motor can respond to tension sensor 576 to adjust rate of speed for slippage. By momentarily driving the shaft 572 at a different speed it is possible to slacken the film between the nip rolls, and reversal can remove the slack.

Another means of introducing slack is to translate a pair of nip rolls (or the idler as noted in dotted lines) slightly on a periodic basis as desired.

What is claimed is:

1. In a heat sealing machine operable on continuous plastic web, the machine including a pair of spaced shuttle rolls reciprocally movable in unison adjacent to a pair of more closely spaced idler rolls, said pairs of rolls adapted to have plastic web threaded thereabout, a drive means arranged to drive said shuttle rolls reciprocally to temporarily stop the plastic film, and a heat die for forming a heat seal in the stopped web located downstream, relative to the direction of normal web movement, of one of said shuttle rolls and wherein an endless timing belt is threaded about said pairs of rolls, and a single direction clutch is engaged with said belt, adapted to prevent said belt between said shuttle rolls and the portion of said film at said heat seal die from moving during the forming of the heat seal as said shuttle is driven in the take-up direction, the improvement wherein said single direction clutch is combined with a drive means for selectively rotating the normally stationary part of the clutch, said drive means energizable after a heat seal formation is made to cause movement of said endless belt and simultaneous movement of said film at said heat seal die away from said heat seal die despite continued normal web stopping movement of the shuttle and endless belt threaded thereabout against the single direction clutch.

* * * * *